United States Patent [19]
Sumi et al.

[11] Patent Number: 5,379,701
[45] Date of Patent: Jan. 10, 1995

[54] SEAT APPARATUS HAVING MOVABLE SEAT USED BY WORKER IN INSTALLING PARTS WITHIN AUTOMOBILE BODY

[75] Inventors: Minoru Sumi; Minoru Uchida; Kyozi Nozue, all of Toyota; Masakatsu Nakane, Okazaki, all of Japan

[73] Assignees: Toyota Jidosha Kabushiki Kaisha; Kyoho Machine Works, Ltd., both of Toyota; Nakane Kogyo Yugengaisya, Okazaki, all of Japan

[21] Appl. No.: 100,411

[22] Filed: Aug. 2, 1993

[30] Foreign Application Priority Data

Aug. 3, 1992 [JP] Japan .............................. 4-060227[U]
Jul. 1, 1993 [JP] Japan .............................. 5-163528

[51] Int. Cl.⁶ .............................................. B61B 3/00
[52] U.S. Cl. ........................................ 104/89; 105/148; 297/217.7; 297/344.12; 297/344.21
[58] Field of Search ........... 297/217, 273, 340, 344.12, 297/344.18, 344.21; 104/89; 105/148, 149.2

[56] References Cited

U.S. PATENT DOCUMENTS

| | | | |
|---|---|---|---|
| 2,508,769 | 5/1950 | Osbon et al. | 297/344.21 |
| 2,935,120 | 5/1960 | Naus | 297/344.21 |
| 4,148,524 | 4/1979 | Guyton | 297/344.18 |
| 4,243,147 | 1/1981 | Twitchell et al. | 104/89 |
| 4,289,076 | 9/1981 | Miller | 104/89 |
| 4,555,138 | 11/1985 | Hughes | 297/344.18 |
| 4,884,842 | 12/1989 | Finkelstein | 297/344.18 |
| 4,909,155 | 3/1990 | Katayama | 104/89 |
| 4,936,222 | 6/1990 | Murai | 105/148 |
| 5,272,984 | 12/1993 | Bolliger et al. | 105/149.2 |

FOREIGN PATENT DOCUMENTS

| | | | |
|---|---|---|---|
| 966601 | 9/1957 | Germany | 297/344.21 |
| 59-185182 | 12/1984 | Japan . | |
| 63-181588 | 11/1988 | Japan . | |
| 63-182983 | 11/1988 | Japan . | |
| 1039642 | 8/1966 | United Kingdom | 297/344.21 |

*Primary Examiner*—John T. Kwon
*Attorney, Agent, or Firm*—Finnegan, Henderson, Farabow, Garrett and Dunner

[57] ABSTRACT

A seat apparatus used by a worker when effecting a job on an automobile is disclosed. The seat apparatus includes: a two-axis support device located above a horizontal feed path of an automobile body, for supporting a suspension carriage such that the carriage is movable in a substantially horizontal plane; a hanger arm attached to the suspension carriage; and a seat member provided on a lower end portion of the hanger arm which can enter the automobile body through its side opening, in a direction perpendicular to the feed path of the body. The seat member on which the worker sits is movable with the suspension carriage in the direction perpendicular to the feed path, and is thus selectively located in a retracted position outside the automobile body, or a working position inside the automobile body, at which the worker is able to effect the job.

19 Claims, 7 Drawing Sheets

SEAT APPARATUS HAVING MOVABLE SEAT USED BY WORKER IN INSTALLING PARTS WITHIN AUTOMOBILE BODY

BACKGROUND OF THE INVENTION

1. Field of the Invention

The present invention relates to a seat apparatus used by a worker for installing parts on an automobile body, which permits the worker to carry out a desired job for installing the parts within the automobile body while sitting down in the automobile body being fed at a predetermined speed.

2. Discussion of the Related Art

In an assembly line in which some parts for an automobile are mounted in the interior of an automobile body while the body is fed at a given speed along a substantially horizontal feed path in the longitudinal direction of the automobile, the worker normally enters the interior space of the automobile body, and carries out a suitable operation for installing the parts within the body while sitting within the automobile body. In this case, the worker is required to get into and get off the automobile body in a half-sitting or half-standing posture, and perform the job while sitting on the floor of the body or in a half-sitting posture, depending upon the location in the body where the job is effected. For installing the parts, the worker is also required to move to the left and right in a narrow space in the automobile body in a half-sitting posture. These requirements undesirably impose a heavy burden on the legs and loins of the worker.

When large-sized automobile parts, such as seats or instrument panels, are installed on the automobile bodies, these parts are hung from hangers or carriers at the upstream end of the assembly line, so that the parts can be moved or transferred in a direction in which the automobile bodies are fed, and are brought into the automobile bodies during the movement of the parts with the bodies, as disclosed in laid-open Publications Nos. 59-185182 and 63-181588 of unexamined Japanese Utility Model Applications. While the burden on the worker for bringing the heavy parts into the automobile body can be considerably reduced, the worker still has to bear a great burden when the worker enters the automobile body and performs the intended job, such as fastening of bolts, in a half-sitting posture.

SUMMARY OF THE INVENTION

It is therefore an object of the present invention to provide a seat apparatus which serves to reduce the burden of the worker when entering the interior space of an automobile body being fed at a given speed and effecting a working operation within the body.

The above object may be accomplished according to the principle of the present invention, which provides a seat apparatus which permits a worker to sit down when entering an interior space of an automobile body being fed at a predetermined speed along a substantially horizontal feed path in a longitudinal direction of the automobile body, and effecting a job within the automobile body for installing parts on the body, the seat apparatus comprising: a two-axis support device located above the feed path of the automobile body, for supporting a suspension carriage such that the suspension carriage is movable in a substantially horizontal plane; a hanger arm attached to the suspension carriage and formed in a curved shape, the hanger arm having a lower end portion which is adapted to enter the automobile body through a side opening of the body, when the suspension carriage is moved while being supported by the two-axis support device in a direction substantially perpendicular to the feed path of the automobile body; and a seat member provided on the lower end portion of the hanger arm, for the worker to sit on the seat member, the seat member being movable with the suspension carriage in the direction substantially perpendicular to the feed path, so as to be placed in a selected one of a retracted position outside the automobile body, and a working position inside the automobile body, at which the worker being able to effect the job.

In the thus constructed seat apparatus used by the worker when installing parts within an automobile body, the seat member is attached via the hanger arm to the suspension carriage which is movable in a substantially horizontal plane while being supported by the two-axis support device. Accordingly, the seat member can be freely moved with the suspension carriage in the substantially horizontal plane. This makes it possible for the worker to get into and get off the automobile body while the body is fed at a predetermined speed along a substantially horizontal feed path, and to move to the left and right within the body while sitting on the seat member, for effecting a desired operation within the body, such as fastening of bolts.

More specifically, the worker sits on the seat member held in its retracted position, and enters the interior of the automobile body, through its side opening. More precisely described, the worker sitting on the seat member moves toward the working position within the automobile body while moving with the automobile body in its feed direction with the worker's hand or foot catching the body being fed at a given speed. After the worker enters the automobile body, the worker sitting on the seat member can move with the body in its feed direction by placing the worker's feet on the floor of the body, and move to the left and right as needed within the body so as to effect the desired job.

While the worker may wear tools, assembly parts, fastening bolts and others, which are used for the job, these may be held or supported by the seat member or the hanger arm supporting the seat member, for example. Upon completion of the job within the automobile body, the worker sitting on the seat member can move toward the retracted position outside the automobile body, while at the same time moving with the automobile body in its feed direction with the worker's hand or foot catching the body being fed at a given speed. Thus, the worker can get out of the automobile body, through the side opening of the body. After getting off the body, the worker can move in the direction opposite to the feed direction of the body, by kicking off the floor of the automobile body while sitting on the seat member, so as to return to the original stand-by position.

While the present seat apparatus may be used such that the worker keep sitting on the seat member throughout the whole job which includes a retuen movement to the stand-by operation as described above, the seat apparatus according to the present invention may be otherwise used. For example, the worker may walk back to the original stand-by position with the seat member pulled by the worker's hand, after getting off the automobile body.

To deal with different kinds of automobile bodies having different heights of side openings through which the seat member passes, the seat apparatus of the present invention may further include first height adjusting means for adjusting the height of the hanger arm attached to the suspension carriage, depending upon the specific kind of the automobile body. The present seat apparatus may also include second height adjusting means for adjusting the height of the seat member provided on the hanger arm, depending upon the height of the individual worker, the content of the job to be effected by the worker, and other factors. Thus, the height of the seat member is controlled so as to enable the worker to conduct the job in the easiest posture. If the length adjusting means is provided for adjusting the length or dimension of the hanger arm as measured in the vertical direction, for example, the same effects as offered by the first height adjusting means can be obtained. If the length adjusting means is provided for adjusting the dimension of the hanger arm as measured in the transverse direction or the direction of the width of the automobile body, the seat member can be placed in the optimum operating position, depending upon the height of the job site within the automobile body, while the hanger arm is kept in the position closest to the automobile body. This leads to an improved working efficiency, since the hanger arm itself need not be moved for positioning the seat member. While two or more kinds of hanger arms having different transverse lengths may be prepared, and selectively used depending upon the height of the job site within the automobile body, this will undesirably push up the cost of manufacture of the seat apparatus.

With the use of the above-described seat apparatus which permits the worker to get into and get off the automobile body and move to the left and right within the body while sitting on the seat member, for effecting the desired job, the burden on the legs and loins of the worker can be considerably reduced, as compared with the burden when the worker takes a half-sitting or half-standing posture for getting in or off or moving within the automobile body.

Further, a plurality of kinds of automobile bodies having different heights of side openings may be dealt with by using the first height adjusting means for adjusting the height of the hanger arm. Moreover, the height of the seat member can be suitably controlled by the second height adjusting means, depending upon the height of the individual worker and the content of the working operation, so as to enable the worker to carry out the job in the easiest or most comfortable posture. If the length adjusting means is provided for adjusting the vertical length of the hanger arm, the same effects as offered by the first height adjusting means can be obtained. If the transverse length of the hanger arm is controlled by the length adjusting means, the seat member can be placed in the optimum operating position which is suitably determined depending upon the level of the job site within the body.

BRIEF DESCRIPTION OF THE DRAWINGS

The above and other objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

Referring to FIGS. 1 through 4, there will be described in detail one preferred embodiment of the present invention in the form of a seat apparatus 10 used by a worker for effecting an assembly operation for assembling parts with an automobile body 12.

Figure 1:
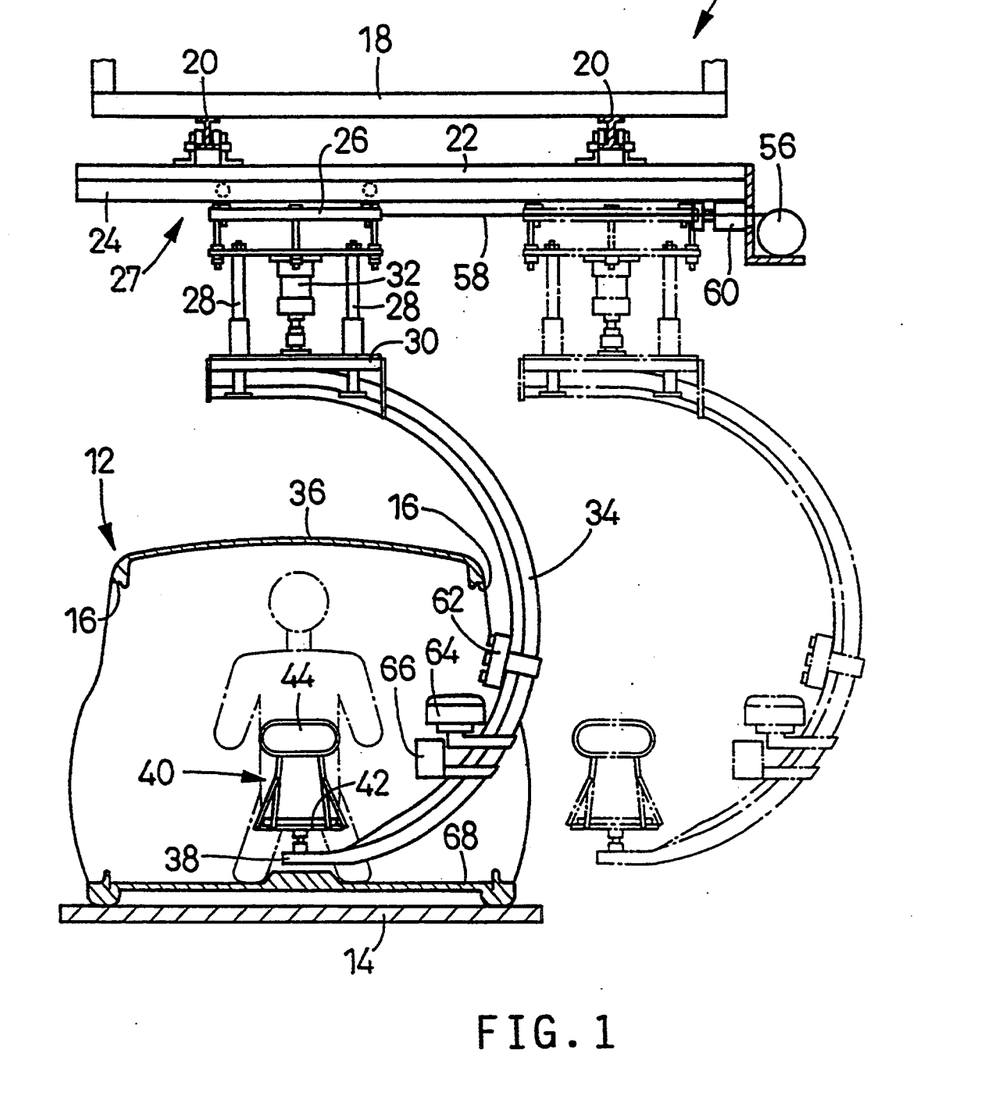
FIG. 1 is a rear elevational view showing one embodiment of a seat apparatus of the present invention, together with an automobile body as viewed from its rear side, the seat apparatus being used upon installation of automobile parts within the automobile body.
Figure 2:
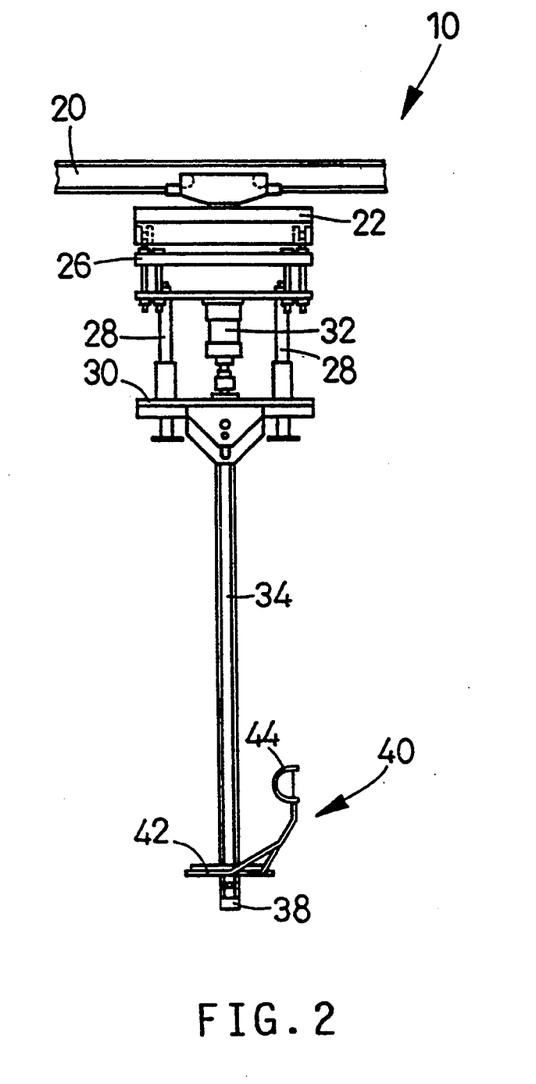
FIG. 2 is a left-hand side elevational view showing the seat apparatus of FIG. 1 from which several components have been removed.

FIG. 1 is a rear elevational view showing the seat apparatus 10 together with the automobile body 12 as viewed from its rear side, and FIG. 2 shows the seat apparatus 10 as viewed from the left-hand side of FIG. 1. The automobile body 12 is fed or conveyed at a given speed by a suitable conveyer or the like in the forward direction of the body 12, along a substantially horizontal assembly line (feed path). That is, the automobile body 12 is fed along a straight line in a direction from the side of a viewer of FIG. 1 toward the plane of FIG. 1. This automobile body 12 has transversely opposite side openings 16 to which respective doors are to be attached. Above the assembly line, a pair of guide rails 20 are fixed to a frame 18 mounted on a ceiling or the like, such that the rails 20 extend in parallel with the assembly line. These guide rails 20 are adapted to support a first movable member 22 via a plurality of wheels. The first movable member 22 is guided by the guide rails 20 such that the member 22 is movable in a direction parallel to the feed direction of the automobile body 12 which is perpendicular to the plane of FIG. 1. Namely, the movable member 22 is movable in the right and left direction as viewed in FIG. 2. The first movable member 22 takes the form of a rectangular frame whose longitudinal sides extend in a substantially horizontal direction that is perpendicular to the above-indicated feed direction of the automobile body 12.

A pair of hanger rails 24 are fixed to the lower surface of the first movable member 22, so as to extend in the longitudinal direction of the member 22. These hanger rails 24 are adapted to support a second movable member 26 via a plurality of wheels. The second movable member 26 is guided by the hanger rails 24 such that the member 26 is movable in a substantially horizontal direction that is perpendicular to the feed direction of the automobile body 12, that is, in the right and left direction of FIG. 1. With the movement of the first movable member 22 supporting the hanger rails 24 and second movable member 26, the second movable member 26 is freely movable in a substantially horizontal plane. The second movable member 26 serves as a suspension carriage, while the guide rails 20, first movable member 22 and hanger rails 24 constitute a two-axis support device 27.

Below the second movable member 26, there is provided an elevating member 30 that is connected to the movable member 26 through four guide rods 28. The elevating member 30 can be moved by a pneumatic cylinder 32 in the vertical direction as seen in FIG. 1. A hanger arm 34 is fixed to the lower surface of the elevating member 30. This hanger arm 34 extends along a substantially semi-circular arc as viewed in the plane perpendicular to the direction of the movement of the first movable member 22, that is, in the plane of FIG. 1. The hanger arm 34 has a lower end portion 38 that is located right below the elevating member 30 namely, directly below the upper end portion of the hanger arm 34 fixed to the elevating member 30. When the second movable member 26 is moved to the left from the right-hand end position thereof as shown in the one-dot chain lines in FIG. 1, a lower portion of the hanger arm 34 including the lower end portion 38 is allowed to enter or pass into the automobile body 12 through the side opening 16 such that an intermediate portion of the arm 34 connecting the upper and lower end portions extends through the side opening 16, as shown in the solid lines in FIG. 1. Normally, an intermediate portion of the hanger arm 38 does not interfere with a roof 36 of the automobile body 12. The hanger arm 34 has a cushion guard or the like wound thereon, for protecting the arm 34 in case it interferes with the automobile body 12. The above-indicated pneumatic cylinder 32 serves as first height adjusting means for adjusting the height of the elevating member 30 and eventually that of the hanger arm 34 in two steps, depending upon the height of the upper end of the opening 16 which varies depending upon the specific kind of the automobile. Thus, the elevating member 30 or hanger arm 34 can be located in a selected one of its upper and lower positions.

Figure 3:
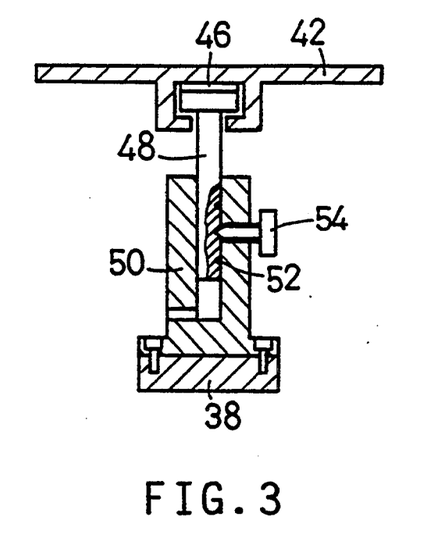
FIG. 3 is a cross sectional view showing in enlargement a structural arrangement for attaching a seat member of the seat apparatus of FIG. 1 to a hanger arm.

To the lower end portion 38 of the hanger arm 34 is attached a seat member 40 which permits the worker to sit on. When the second movable member 26 is moved to the right as viewed in FIG. 1, the seat member 40 is located in its retracted position outside the automobile body 12, as indicated in the one-dot chain lines in FIG. 1. When the second movable member 26 is moved to the left as viewed in FIG. 1, on the other hand, the seat member 40 enters an interior space of the automobile body 12 through the right-hand side opening 16, and is thus located in its working position. The seat member 40 includes a disc-like seat portion 42 and a back rest 44, which are provided with cushions or the like. The seat portion 42 is supported by a support rod 48 through a slidable metal disc 46, as shown in FIG. 3, such that the seat portion 42 is rotatable about a substantially vertical axis. The support rod 48 is fitted in a rod holder 50 fixed on the lower end portion 38 of the hanger arm 34, such that the rod 48 is movable in its axial direction. The support rod 48 is formed with three notches 52 which are spaced apart from each other and arranged in a row parallel to the axial direction of the rod 48. With a height-adjusting bolt 54 threaded through a tapped hole in the rod holder 50, for engagement with a selected one of the notches 52, the support rod 48 is fixed in position, and the seat member 40 provided on the rod 48 can be located in a desired height position. In the instant embodiment, the support rod 48, rod holder 50 and height adjusting bolt 54 constitute second height adjusting means for adjusting the height of the seat member 40, depending upon the height of the individual worker, and/or the height position in the automobile body 12 at which the worker performs a specific job.

The second movable member 26 is connected through a wire 58 to a spring balancer 56 disposed at the right-hand end of the first movable member 22 as shown in FIG. 1, so that the movable member 26 is normally biased in the right direction of FIG. 1, under a biasing force of a spiral spring incorporated in the spring balancer 56. In this arrangement, the seat member 40 located in its retracted position is prevented from moving toward its working position due to vibrations, for example, and colliding with the automobile body 12 that is being fed along the assembly line. Since the biasing force of the spiral spring of the spring balancer 56 is relatively weak, the second movable member 26 can be easily moved by the worker to the left as viewed in FIG. 1, against the biasing force of the spring. At the right-hand end of the first movable member 22, there is also provided a shock absorber 60 which serves to determine the right-hand end position of the second movable member 26, that is, the retracted position of the seat member 40. The shock absorber 60 contains a fluid whose flow resistance provides a damping effect upon abutting contact with the second movable member 26.

To the hanger arm 34 as described above, there are attached a switch box 62 having various switches, a parts case 64 for accommodating parts to be installed or mounted on the automobile body 12, fastening bolts and others and, a tool box 66 for receiving working tools, such as impact wrenches. The switch box 62 may include: a change-over switch for placing the pneumatic cylinder 32 in a selected one of its upper and lower positions so as to control the height of the hanger arm 34 depending upon the specific kind of the automobile body 12; an emergency stop switch; and a call switch for activating a suitable indicator light, for example. Electric wires to be connected to these switches and pneumatic conduits for driving the working tools are installed along the arc of the hanger arm 34, by means of fasteners (not shown). It will be noted that the switch box 62, parts case 64, tool box 66 and others provided on the hanger arm 34 are not shown in FIG. 2.

In the seat apparatus 10 constructed as described above, the seat member 40 on which the worker is seated can be freely moved in the same direction as the feed direction of the automobile body 12, due to the movement of the first movable member 22, and can also be freely moved in the direction perpendicular to the feed direction of the automobile body 12, due to the movement of the second movable member 26. This permits the worker to enter the interior of the automobile body 12, and effect an intended working operation while sitting on the seat member 40, to get out of the automobile body 12 upon completion of the operation, and to return to the original stand-by position. There will be described one example of the use of the seat apparatus 10 for effecting a job within the automobile body 12.

Figure 4:
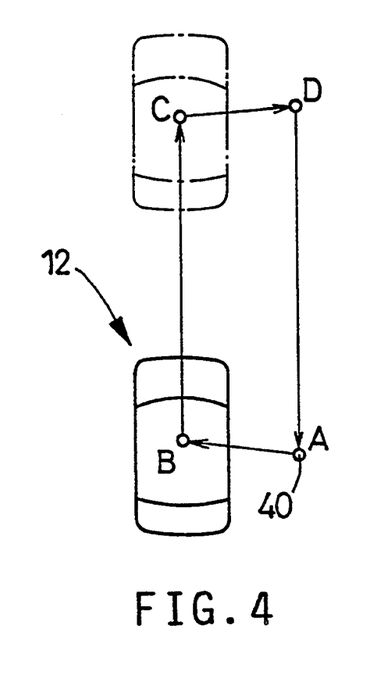
FIG. 4 is a view explaining movements of the seat member when the installation of the parts on the automobile body is effected using the seat apparatus of FIG. 1.

Initially, when the seat member 40 is placed in the original stand-by position "A" as shown in FIG. 4, that is, the seat member 40 is placed in its retracted position with the second movable member 26 located in the right-hand end position as viewed in FIG. 1, the worker checks if the height of the seat member 40 suits the height of the worker or the height in the automobile body 12 at which the job is effected. Then, if necessary, the worker loosens the height-adjusting bolt 54 and moves the support rod 48 in the vertical position, so that the height of the seat member 40 is suitably controlled so as to enable the worker to conduct the job in the easiest or most comfortable posture. Then, the worker sits on the seat member 40 and waits for a while for the next automobile body 12 to reach the stand-by position "A". During this waiting time, the worker confirms the specific kind of the automobile having the body 12 to be fed next, and operates the change-over switch on the switch box 62 as needed, so as to control the height of the hanger arm 34 by placing the pneumatic cylinder 32 in the appropriate operating position.

When the automobile body 12 reaches the stand-by position "A", the worker sits on the seat member 40, catches the automobile body 12 by the hand and/or foot while the worker is sitting on the seat member 40, and moves toward the working position within the automobile body 12 while the automobile body 12 is fed at a given speed, in the feed direction of the body 12. In this manner, the worker enters the interior of the automobile body 12 through the side opening 16, and reaches the working position "B" as indicated in FIG. 4. Within the automobile body 12, the worker moves with the automobile body 12 in its feed direction with the worker's feet placed on a floor 68 of the automobile body 12. In this condition, the worker takes fastening bolts out of the parts case 64, for example, and conducts an intended working operation while moving leftward or rightward within the body 12 as needed. Since the seat member 40 is rotatable about the substantially vertical axis, the worker can freely turn to the left or the right while sitting on the seat member 40. Thus, the rotary movement of the seat member 40 makes it easy for the worker to get into the automobile body 12 and works within the body 12. For instance, the worker can easily get into the automobile body 12 with his/her back facing the automobile body 12.

Upon completion of the intended job, the worker catches the automobile body 12 by the hand and/or foot while sitting on the seat member 40, and moves toward the retracted position of the seat member 40 while being moved with the automobile body 12 in its feed position. In this manner, the worker gets out of the automobile body 12 through the side opening 16. In FIG. 4, the working operation is finished at the position "C", and the worker gets off the automobile body 12 at the position "D". Then, the worker returns to the original stand-by position "A", by kicking off the floor 68 with the foot while sitting on the seat member 40, and moving in the direction opposite to the feed direction of the automobile body 12.

With the use of the seat apparatus 10 according to the instant embodiment, the worker can get into and get off the automobile body 12 while sitting on the seat member 40, and can move to the left or right within the body 12 for carrying out a desired parts mounting operation while sitting on the seat member 40. Accordingly, the burden imposed on the legs and loins of the worker throughout the working operation can be considerably reduced, as compared with the burden in the conventional case where the worker gets in and gets off the automobile body 12 and moves therein in a half-sitting posture.

In the instant embodiment, the height of the seat member 40 can be adjusted by loosening the height-adjusting bolt 54 and moving the support rod 48 in the vertical direction. Accordingly, the worker can carry out the job in the easiest or most comfortable posture, with the height of the seat member 40 desirably determined depending upon the height of the individual worker and the content of the job. Further, the height of the hanger arm 34 can be controlled by placing the pneumatic cylinder 32 in the suitable operating position, whereby the seat apparatus 10 can be used with a plurality of kinds of vehicle bodies 12 whose openings 16 have different heights. In this particular embodiment, the worker is able to adjust the height of the hanger arm 34 while sitting on the seat member 40 since the operating position of the pneumatic cylinder 32 can be changed by the change-over switch provided on the switch box 62.

Further, in the present embodiment, the seat member 40 is rotatable about the substantially vertical axis. This advantageously permits the worker to turn to the left or the right as desired while sitting on the seat member 40, and makes it easy for the worker to get into and get off the automobile body 12 and effect the installation of parts within the automobile body 12.

While the worker sits on the seat member 40 throughout the whole job in the illustrated embodiment, the seat apparatus 10 may be otherwise used. For instance, the worker may once get off the seat member 40 at the position "D", and walk back to the stand-by position "A" while pulling the hanger arm 34 and seat member 40 by the hand(s).

In the illustrated embodiment, the worker sitting on the seat member 40 moves with the automobile body 12 by catching the body 12 by the foot and/or hand. However, the first movable member 22 which moves in the same direction as the feed direction of the automobile body 12 may be moved in the same feed direction at the same speed as the feed speed of the automobile body 12, or moved in the direction opposite to the feed direction, by a suitable drive means, such as an electric motor or a power driven feed screw. The drive means may be activated by operating a switch provided on the hanger arm 34, for example. In this case, an interlock connected to the feeding device for the automobile body 12 may be provided in the drive means for the first movable member 22, for inhibiting the movement of the first movable member 22 when the automobile body 12 is stopped. Alternatively, an electric motor or the like may be used to move the hanger arm 34 only when the worker gets off the 10 automobile body 12 and returns to the stand-by position "A".

In the illustrated embodiment, the first movable member 22 is movably connected to the guide rails 20 which extend in parallel with the feed direction of the automobile body 12, while the hanger rails 24 are mounted on the first movable member 22 so as to extend in the direction perpendicular to the above feed direction, whereby the second movable member 26 connected to the hanger rails 24 can be moved in a substantially horizontal plane. However, the directions of extension of the guide rails 20 and hanger rails 24 may be changed as needed, provided the seat member 40 can be moved along the rails 20, 24 over a range which is required for effecting a desired working operation within the automobile body 12.

In the illustrated embodiment, the worker places his/her feet on the floor 68 during the job so as to move the seat member 40 with the automobile body 12. However, the hanger arm 34 may be provided with an engaging member which is brought into engagement with the floor 68 or a center pillar of the automobile body 12, for example, so as to move the seat member 40 with the automobile body 12.

While the pneumatic cylinder 32 is used for controlling the height of the hanger arm 34 to a selected one of the upper and lower positions in the illustrated embodiment, the height of the hanger arm 34 is not necessarily controlled if the position of the upper end of the opening 16 does not vary so much from one automobile body 12 to another. It is also possible to control the height of the hanger arm 34 in a continuously variable manner, by means of an electric motor or a feed screw, for example.

The height of the seat member 40 may also be continuously adjusted, by forming a flat portion in the outer circumferential surface of the support rod 48 and pressing a flat top face of a bolt against the flat surface of the rod 48. Alternatively, a pneumatic cylinder, an electric motor, a feed screw or the like as used for the hanger arm 34 may be used for adjusting the height of the seat member 40 by a switch operation. Further, the above-indicated notches 52 formed in the support rod 48 may be replaced by annular grooves, which serve to avoid poor fastening of the height-adjusting bolt 54 on the support rod 48 due to an angular mismatch between the bolt 54 and the notches 52 formed on the support rod 48.

while the slidable metal disc 46 is used for supporting the seat member 40 in a rotatable manner in the illustrated embodiment, this metal disc 46 may be replaced by a thrust bearing, for example. Otherwise, the seat member 40 may be unrotatably mounted on the support rod 48 and rod holder 50.

The hanger arm 34 may be formed of a resin material to thereby reduce the overall weight of the seat apparatus 10, or may take the form of a hollow pipe or the like, for accommodating therein an electric wire(s) and/or pneumatic conduit(s).

In the illustrated embodiment, the second movable member 26 is biased by the spring balancer 56 so that the the hanger arm 34 is biased to the right as viewed in FIG. 1, under the biasing force of the balancer 56. However, the hanger arm 34 may be otherwise biased. For instance, the hanger rails 24 per se may be inclined such that the middle portion of each rail 24 is higher than the other portions, so as to place the hanger arm 34 by gravity in a desired one of a first position to which the seat member 40 leaving the automobile body 12 is moved, and a second position to which the seat member 40 is moved for the worker to work within the automobile body 12.

There will be next described further embodiments of the present invention. In the following description, the same reference numerals as used in the above description of the first embodiment will be used for identifying structurally and/or functionally corresponding elements, for which no detailed explanation will be provided.

Figure 5:
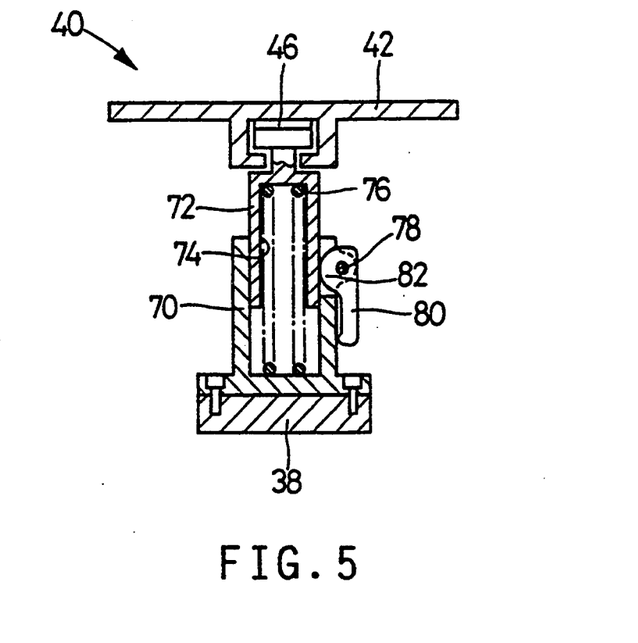
FIG. 5 is a cross sectional view showing another arrangement for attaching the seat member to the hanger arm.

Referring first to FIG. 5 showing another form of the second height adjusting means, a cylindrical holder 70 which is open at its upper end and closed at its lower end is fixed to the lower end portion 38 of the hanger arm 34 as described above. This cylindrical holder 70 receives therein a support sleeve 72 for rotatably supporting the seat portion 42 of the seat member 40, such that the support sleeve 72 is movable in the axial direction. The support sleeve 72 has an inner bore 74 which is open on the lower end face of the sleeve 72, and is closed at its upper end. A compression coil spring 76 for biasing the support sleeve 72 upwards is provided between the bottom of the inner bore 74 and the bottom of the holder 70. The holder 70 is provided with a clamp lever 80 which is pivotable about a pin 78. The clamp lever 80 has a cam 82 having a continuously varying radial dimension as measured from the pin 78. With the clamp lever 80 operated to the clamp position as shown in FIG. 5, the cam 82 is pressed against the outer circumferential surface of the support sleeve 72, whereby the sleeve 72 is fixed in this position such that the sleeve 72 is immovable relative to the holder 70. In this arrangement, the height of the seat member 40 can be easily changed in the following manner. Initially, the clamp lever 80 is rotated in the counterclockwise direction (or upwards) in FIG. 5, so as to disengage the cam 82 from the support sleeve 72. After adjusting the height of the seat member 40 as desired, the clamp lever 80 is re-operated to the clamp position of FIG. 5, so as to establish the desired height of the seat member 40. In this embodiment, the second height adjusting means is constituted by the cylindrical holder 70, support sleeve 72, compression coil spring 76, clamp lever 80 and others. The compression coil spring 76 may be replaced by an air spring.

Figure 6:
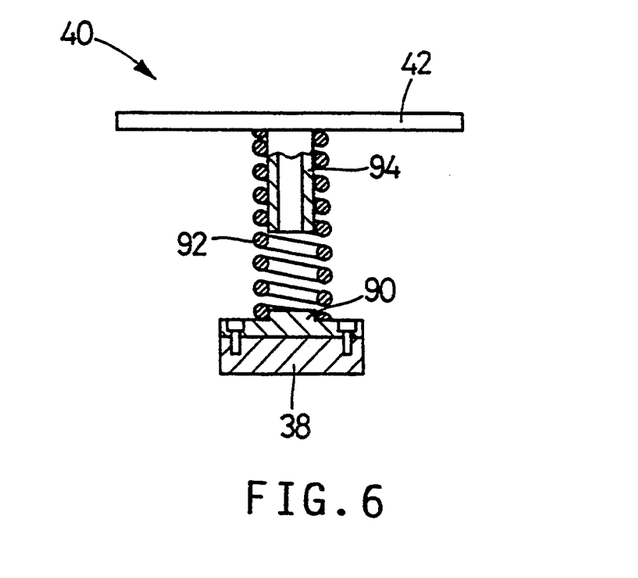
FIG. 6 is a cross sectional view showing a further arrangement for attaching the seat member to the hanger arm.

FIG. 6 shows another embodiment of the present invention in which a compression coil spring 92 is fixed to the lower end portion 38 of the hanger arm 34 via a plate 90. The seat member 40 includes a cylindrical portion 94 which is fixed to the lower surface of the seat portion 42, and which is fitted in the upper portion of the coil spring 92 such that the cylindrical portion 94 is rotatable about its axis. In this arrangement, the compression coil spring 92 functions as a cushion, that is, is capable of changing its length as desired, so that the position or posture of the seat portion 42 or seat member 40 can be freely changed as desired depending upon the posture of the worker, thus further facilitating the worker's job. Since the seat member 40 is just received in the upper portion of the compression coil spring 92, the seat member 40 of one kind can be easily replaced by another kind depending upon the content of the working operation or the taste of the worker, for example.

Figure 7:
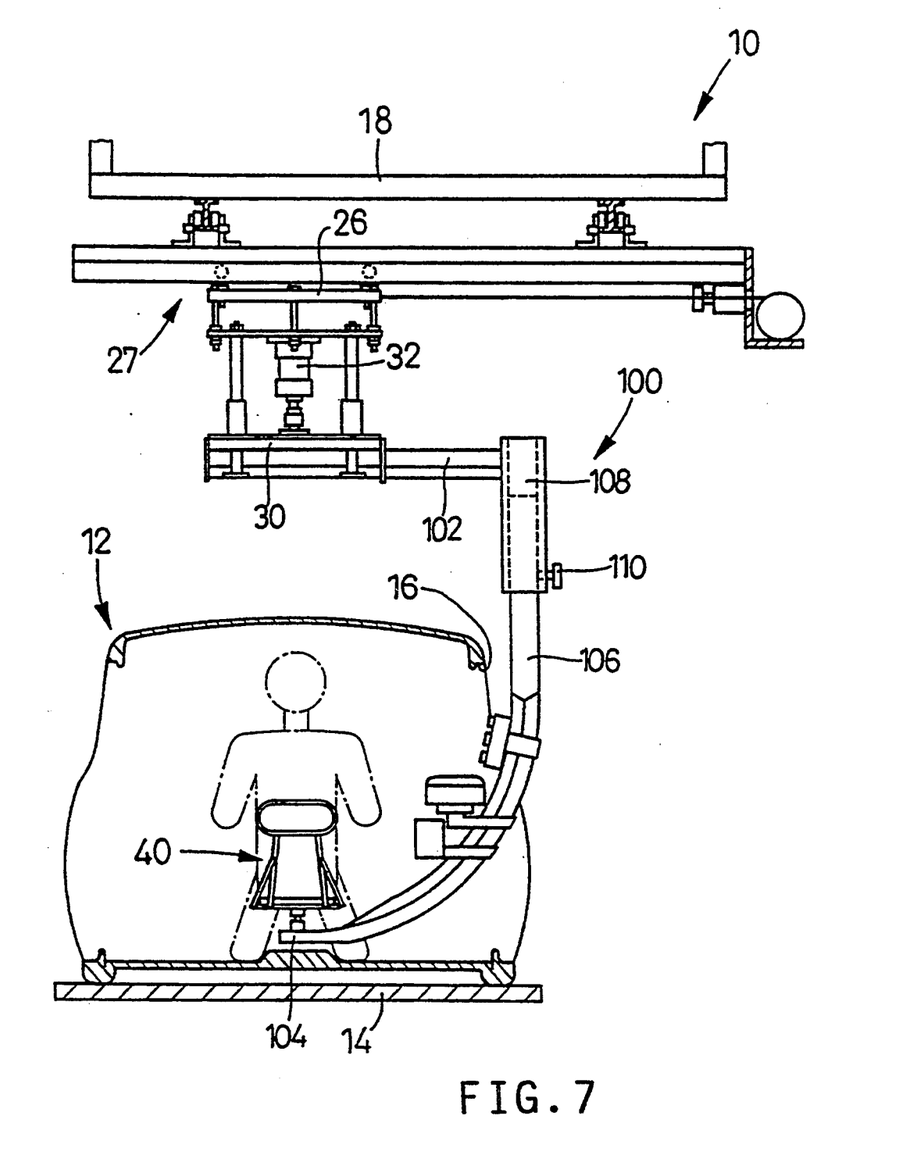
FIG. 7 is a view corresponding to that of FIG. 1, showing another form of the hanger arm of the seat apparatus of the invention.

Referring next to FIG. 7, there is shown another form of a hanger arm 100 which includes a first arm portion 102 fixed to the elevating member 30 and extending in the width direction of the automobile body 12, and a second arm portion 106 taking a substantially J-shaped form as viewed in a vertical plane perpendicular to the feed direction of the automobile body 12, and having a lower end portion 104 which can enter the interior space of the automobile body 12. A cylindrical holder 108 is fixed to the distal end of the first arm portion 102, so as to extend in the vertical direction as seen in FIG. 7, and the upper portion of the second arm portion 106 is slidably received in this holder 108 such that the portion 106 is rotatable about its axis and movable in the axial direction. With a stopper screw 110 screwed through a tapped hole in the holder 108, the second arm portion 106 is fixed in position within the holder 108. Thus, the hanger arm 100 of this embodiment can be used with a plurality of kinds of vehicle bodies 12 having different heights of the side openings 16, since the height of the second arm portion 106 can be adjusted by loosening and fastening the stopper screw 110. Further, the angular position of the second arm portion 106 about the axis of the holder 108 can be suitably adjusted, to assure the ease with which the arm portion 106 enters the automobile body 12, or the location in the body 12 at which the worker's job is effected, for example. This makes it further easier for the worker to get into and get off the automobile body 12 and carry out the working operation. Thus, the cylindrical holder 108, the stopper screw 110 and others constitute length adjusting means for adjusting the length of the hanger arm 100, depending upon the height of the job site within the automobile body 12. As an alternative, the holder 108 and the upper end portion of the second arm portion 106 may have different cross sectional shapes, permitting the arm portion 106 to move only in the axial direction so as to adjust the length of the hanger arm 100.

Figure 8:
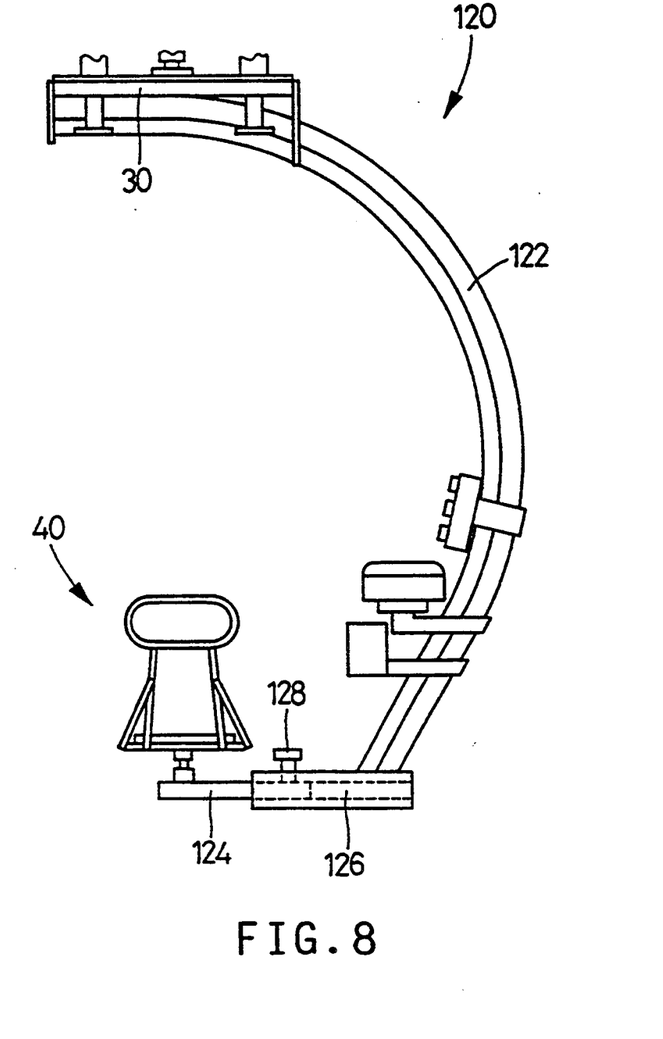
FIG. 8 is a view showing a further form of the hanger arm.

FIG. 8 shows another form of the length adjusting means as described above, for adjusting the length of a hanger arm 120. The hanger arm 120 consists of an arm body 122 having substantially the same shape as the hanger arm 34 used in the first embodiment, and a sliding member 124 on which the seat member 40 is provided. The sliding member 124 is slidably received in a holder 126 fixed to the lower end of the arm body 122, so as to extend in a horizontal direction substantially perpendicular to the feed direction of the automobile body 12. While the sliding member 124 is movable in the transverse or lateral direction of the automobile body 12, the sliding member 124 is fixed in a desired position by screwing a stopper screw 128 into the holder 126. When the hanger arm 120 is held in engagement with the roof 36 of the automobile body 12, for example, the seat member 40 can be suitably placed in a position which is best suited for an intended working operation, to thereby assure a further improved operating efficiency. Namely, when the hanger arm 34 used in the first embodiment is held in engagement of the roof 36 of the automobile body 12, as shown in FIG. 1, the seat member 40 is located almost in the middle of the width of the automobile body 12, whereby the operating efficiency may deteriorate when the job should be effected on the the left portion of the automobile body 12. In this condition of FIG. 1, the worker also has some difficulty in working on the right portion of the body 12, since the hanger arm 34 must be moved in the right direction, in other words, the hanger arm 34 must be disengaged from the roof 36 and held in an unstable state swaying in the transverse direction of the body 12. In the instant embodiment, on the other hand, the seat member 40 can be placed in the optimum position depending upon the height of the job site within the body 12, while the hanger arm 120 is held in engagement of the roof 36 of the automobile body 12, for example. Thus, in this embodiment, the holder 126, the stopper screw 128 and others constitute length adjusting means for adjusting the length of the hanger arm 120. The holder 126 and sliding member 124 may have circular cross sections for permitting relative rotary movements about their axis as well as relative movements in the transverse direction as seen in FIG. 8, or may have different cross sections which only permit the relative movements in the transverse direction. While a plurality of kinds of hanger arms having different transverse lengths may be prepared and selectively used depending upon the location of the job, this will undesirably push up the cost of manufacture of the seat apparatus.

Figure 9:
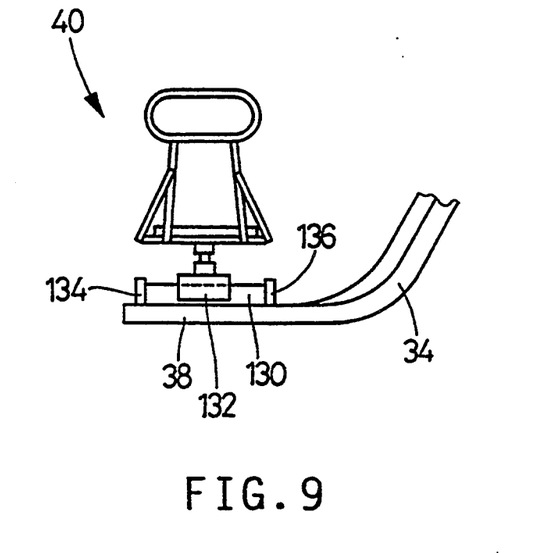
FIG. 9 is a view showing a still further arrangement for attaching the seat member to the hanger arm.

Referring to FIG. 9 showing a further embodiment of the present invention, the hanger arm 34 as used in the first embodiment has an elongated lower end portion 38 to which a guide rail 130 is attached. The seat member 40 is attached to a slide 132 which is movably mounted on the guide rail 130. The guide rail 130 has stoppers 134, 136 fixed to longitudinally opposite ends thereof. In this arrangement, when the hanger arm 34 enters or gets out of the automobile body 12, the whole structure of the hanger arm 34 is moved in the transverse direction with the slide 132 being held in abutting contact with the stopper 134 or 136. When the job is effected within the automobile body 12, however, the hanger arm 34 is held in engagement with the roof 36 of the automobile body 12, for example, and only the seat member 40 needs to be moved in the transverse direction, depending upon the location in the automobile body 12 where the job is to be effected. This arrangement leads to an improved operating efficiency as compared with the arrangement in which the whole structure of the hanger arm 34 is moved for positioning the seat member 40.

While the present invention has been described in its presently preferred embodiments, for illustrative purpose only, it is to be understood that the invention is by no means limited to the details of the illustrated embodiments, but may be embodied with various other changes, modifications and improvements which may occur to those skilled in the art, without departing from the scope and spirit of the invention as defined in the following claims.

What is claimed is:

1. A seat apparatus which permits a worker to sit down when entering an interior space of an automobile body being fed at a predetermined speed along a substantially horizontal feed path in a longitudinal direction of the automobile body, and effecting a job within the automobile body for installing parts on the body, said seat apparatus comprising:

a two-axis support device located above said feed path of the automobile body, for supporting a suspension carriage such that the suspension carriage is movable in a substantially horizontal plane;

a hanger arm attached to said suspension carriage and formed in a generally curved shape, said hanger arm having an upper end portion fixed to said suspension carriage, a lower end portion, and an intermediate portion connecting said upper and lower end portions, said intermediate portion being shaped so that said lower end portion is located below said upper end portion and so that said intermediate portion extends through a side opening of the body, when said lower end portion is located within said automobile body with said suspension carriage being moved while being supported by said two-axis support device, in a direction substantially perpendicular to said feed path of the automobile body; and     a seat member provided on said lower end portion of said hanger arm, for the worker to sit on said seat member, said seat member being movable with said suspension carriage in said direction substantially perpendicular to said feed path, so as to be placed in a selected one of a retracted position outside said automobile body, and a working position inside the automobile body, at which the worker is able to effect said job.

2. A seat apparatus according to claim 1, wherein said two-axis support device comprises:

a pair of guide rails fixed to a stationary member and extending in a first direction parallel to said feed path of the automobile body;

a movable member supported by said pair of guide rails and extending in a second direction perpendicular to said feed path of the automobile body, said movable member being movable in said first direction; and a pair of hanger rails fixed to said movable member and extending in said second direction, said suspension carriage being supported by said pair of hanger rails such that the suspension carriage is movable in said second direction and said first direction.

3. A seat apparatus according to claim 1, wherein said hanger arm extends along a semicircular arc such that said lower end portion of the hanger arm is located below said upper end portion of the hanger arm.

4. A seat apparatus according to claim 1, further comprising means for connecting said seat member to said lower end portion of said hanger arm, such that the seat member is rotatable about an axis thereof.

5. A seat apparatus according to claim 1, further comprising first height adjusting means for adjusting the height of said hanger arm attached to said suspension carriage.

6. A seat apparatus according to claim 5, further comprising an elevating member connected to said suspension carriage through a plurality of guide rods, said hanger arm being fixed to said elevating member, said first height adjusting means comprising a pneumatic cylinder provided between said elevating member and said suspension carriage, for moving the elevating member in a vertical direction of the automobile body, so as to control the height of said hanger arm.

7. A seat apparatus according to claim 1, further comprising second height adjusting means for adjusting the height of said seat member provided on said hanger arm.

8. A seat apparatus according to claim 7, wherein said second height adjusting means comprises:

a support rod connected to said seat member, said support rod having a plurality of recesses formed in an outer surface thereof, which recesses are spaced apart from each other in an axial direction of the support rod;

a rod holder fixed to said lower end portion of said hanger arm, said rod holder receiving said support rod such that the support rod is axially movable relative to the rod holder; and a height-adjusting bolt screwed through said rod holder, and engageable with a selected one of said recesses of said support rod, so as to adjust the height of said seat member.

9. A seat apparatus according to claim 8, wherein said plurality of said recesses of said support rod comprises three notches arranged in a row parallel to said axial direction of the support rod.

10. A seat apparatus according to claim 7, wherein said second height adjusting means comprises:

a support sleeve connected to said seat member and having an inner bore which is open at a lower axial end thereof;

a cylindrical holder fixed to said lower end portion of said hanger arm and having an inner bore which is open at an upper axial end thereof, said cylindrical holder receiving said support sleeve such that the support sleeve is axially movable relative to the cylindrical holder;

a compression coil spring provided between a bottom wall of said inner bore of said support sleeve and a bottom wall of said inner bore of said cylindrical holder, for biasing said support sleeve toward said seat member; and a clamp lever provided on said cylindrical holder, for clamping said support sleeve so that the support sleeve is fixed at a selected position with respect to said cylindrical holder.

11. A seat apparatus according to claim 1, further comprising a coil spring disposed between said seat member and said lower end portion of said hanger arm, for flexibly connecting the seat member and the hanger arm.

12. A seat apparatus according to claim 1, further comprising length adjusting means for adjusting the length of said hanger arm.

13. A seat apparatus according to claim 12, wherein said hanger arm comprises a first arm portion connected to said suspension carriage and extending in a width direction of the automobile body, and a second arm portion substantially extending in a vertical direction of the automobile body and including said lower end portion of the hanger arm, said length adjusting means comprising:

a holder fixed to a distal end of said first arm portion and slidably receiving an upper end portion of said second arm portion, such that the second arm portion is movable in the vertical direction of the automobile body; and a stopper screw screwed through said holder, and engageable with said second arm portion of said hanger arm, so as to fix said second arm portion at a selected position, to thereby control a dimension of the hanger arm as measured in said vertical direction.

14. A seat apparatus according to claim 12, wherein said hanger arm includes an arcuate arm body, and a slidable member as said lower end portion, said length adjusting means comprising:

a holder fixed to a lower distal end of said arcuate arm body and slidably receiving said slidable member, such that said slidable member is movable in a width direction of the automobile body; and a stopper screw screwed through said holder, and engageable with said slidable member, so as to fix the slidable member at a selected position, to thereby control a dimension of the hanger arm as measured in said width direction.

15. A seat apparatus according to claim 1, wherein said seat member is slidably supported by said lower end portion of said hanger arm such that the seat member is movable in a width direction of the automobile body.

16. A seat apparatus which permits a worker to sit down when entering an interior space of an automobile body being fed at a predetermined speed along substantially horizontal feed path in a longitudinal direction of the automobile body, and effecting a job within the automobile body for installing parts on the body, said seat apparatus comprising:

a two-axis support device located above said feed path of the automobile body, for supporting a suspension carriage such that the suspension carriage is movable in a substantially horizontal plane;

a hanger arm attached to said suspension carriage and formed in a curved shape, said hanger arm having a lower end portion which is adapted to enter said automobile body through a side opening of the body, when said suspension carriage is moved while being supported by said two-axis support device, in a direction substantially perpendicular to said feed path of the automobile body;

a seat member provided on said lower end portion of said hanger arm, for the worker to sit on said seat member, said seat member being movable with said suspension carriage in said direction substantially perpendicular to said feed path, so as to be placed in a selected one of a retracted position outside said automobile body, and a working position inside the automobile body, at which the worker is able to effect said job; and length adjusting means for adjusting the length of said hanger arm.

17. A seat apparatus according to claim 16, wherein said hanger arm comprises a first arm portion connected to said suspension carriage and extending in a width direction of the automobile body, and a second arm portion substantially extending in a vertical direction of the automobile body and including said lower end portion of the hanger arm, said length adjusting means comprising:

a holder fixed to a distal end of said first arm portion and slidably receiving an upper end portion of said second arm portion, such that the second arm portion is movable in the vertical direction of the automobile body; and a stopper screw screwed through said holder, and engageable with said second arm portion of said hanger arm, so as to fix said second arm portion at a selected position, to thereby control a dimension of the hanger arm as measured in said vertical direction.

18. A seat apparatus according to claim 16, wherein said hanger arm includes an arcuate arm body, and a slidable member as said end portion, said length adjusting means comprising:

a holder fixed to a lower distal end of said arcuate arm body and slidably receiving said slidable member, such that said slidable member is movable in a width direction of the automobile body; and a stopper screw screwed through said holder, and engageable with said slidable member, so as to fix the slidable member at a selected position, to thereby control a dimension of the hanger arm as measured in said width direction.

19. A seat apparatus which permits a worker to sit down when entering an interior space of an automobile body being fed at a predetermined speed along a substantially horizontal feed path in a longitudinal direction of the automobile body, and effecting a job within the automobile body for installing parts on the body, said seat apparatus comprising:

a two-axis support device located above said feed path of the automobile body, for supporting a suspension carriage such that the suspension carriage is movable in a substantially horizontal plane;

a hanger arm attached to said suspension carriage and formed in a curved shape, said hanger arm having a lower end portion which is adapted to enter said automobile body through a side opening of the body, when said suspension carriage is moved while being supported by said two-axis support device, in a direction substantially perpendicular to said feed path of the automobile body; and a seat member provided on said lower end portion of said hanger arm, for the worker to sit on said seat member, said seat member being movable with said suspension carriage in said direction substantially perpendicular to said feed path, so as to be placed in a selected one of a retracted position outside said automobile body, at which the worker is able to effect said job, said seat member being slidably supported by said lower end portion of said hanger arm such that the seat member is movable in a width direction of the automobile body.

* * * * *